Oct. 13, 1953   E. R. HECHT   2,654,933
LICENSE PLATE FASTENING DEVICE
Filed Oct. 3, 1951
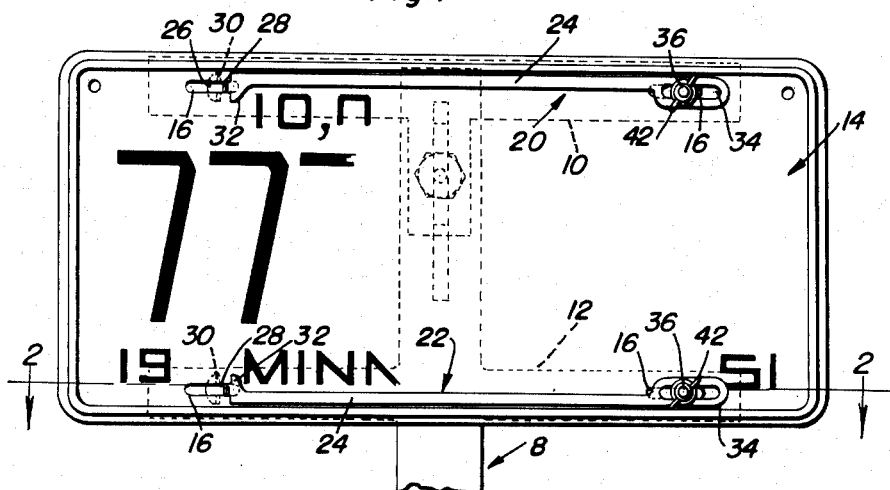
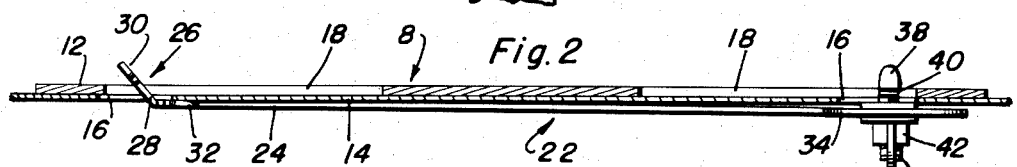
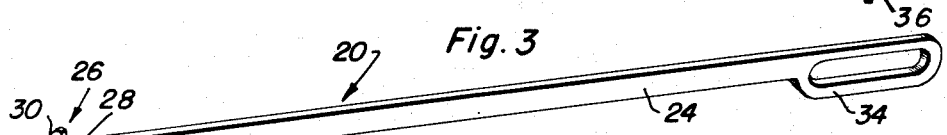
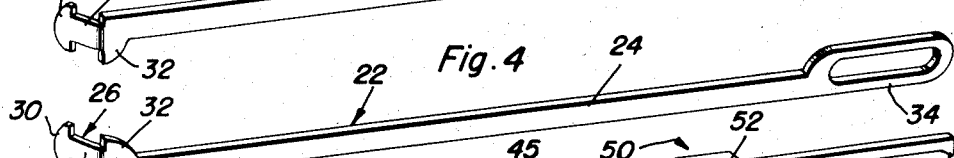
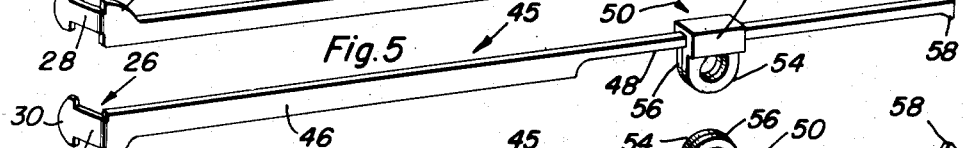
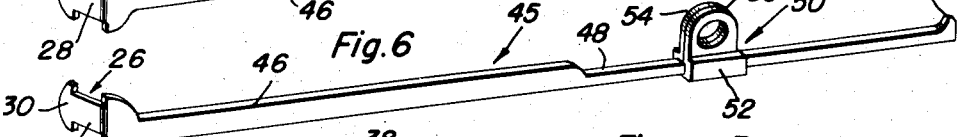
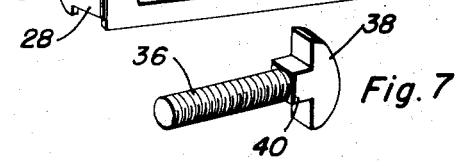
Elmer R. Hecht
INVENTOR.

Patented Oct. 13, 1953

2,654,933

UNITED STATES PATENT OFFICE 2,654,933

LICENSE PLATE FASTENING DEVICE

Elmer R. Hecht, Lakefield, Minn.

Application October 3, 1951, Serial No. 249,485

1 Claim. (Cl. 24—243)

The present invention relates to certain new and useful improvements in automobile license plate fastening devices and has more particular reference to devices which, while usable by members of the public, are chiefly intended for use by automobile salesmen and dealers in both new and used cars.

It is a matter of common knowledge that salesmen and others working for car dealers are called upon to attach special dealer's tags or plates and are likewise called upon to shift regular license plates from one car to another. Because of this there has been a constant demand for license plate fastening devices which may be readily and easily installed and likewise expeditiously removed. It is an object of the invention to provide a fastener which is characterized by an elongated member which takes the form of a bar and is adapted to be superimposed against the license plate and to extend from one bolt accommodating slot to the other bolt accommodating slot, said member having integral laterally disposed means at one end insertable through and anchorable in one slot and having bolt and nut means on the other end which latter means is slidable and otherwise made to enable it to properly coact with the first named means.

More specifically novelty is predicated on an elongated bar or equivalent member having bolt and nut fastening means slidably mounted on one end portion and having its opposite end laterally bent and of general T-shaped form whereby to provide a readily insertable, turnable and removable retaining element.

Other objects and advantages will become more readily apparent from the following description and the accompanying sheet of illustrative drawings.

In the accompanying sheet of drawings wherein like numerals are employed to designate like parts throughout the views:

Figure 1 is an elevational view showing the complete assembly of license plate, bracket and fastening devices, the latter made in accordance with the present invention;

Figure 2 is a horizontal section on the line 2—2 of Figure 1, looking in the direction of the arrows;

Figure 3 is a perspective view of the upper fastener or bracket;

Figure 4 is a perspective view of the companion or complemental fastener or lower bracket;

Figure 5 is a perspective view showing a modified form of upper fastener;

Figure 6 is also a perspective view of the lower complement for said "modified" form appearing in Figure 5; and Figure 7 is a perspective view showing one of the bolts which are used.

Referring now to the drawings by reference numerals and accompanying lead lines the conventional tag or plate supporting bracket means is denoted by the numeral 8 and this embodies the usual slotted upper and lower parallel arms 10 and 12. The license plate, also conventional, is denoted by the numeral 14, this being provided with customary bolt holes 16 registerable with slots or holes 18 in the coacting arms of the bracket means 8. Usually the tag or plate is fastened on the slotted arms as is well known by stove bolts. In this instance it is desirable to have devices which may be quickly applied and removed so that license plates may be exchanged from time to time with a minimum amount of time and effort involved.

The brackets or devices used for achieving the herein desired ends are used, as stated, in pairs and the upper bracket is denoted by the numeral 20 and the lower one by the numeral 22.

Basically they are the same in construction and for this reason it is felt that a description of one will suffice for both. To this end each device is characterized by an elongated member with bolt and nut means slidable mounted on one end and integral attaching and retaining means at the opposite ends. Specifically each device comprises an elongated metal bar or strap 24 having a lateral T-shaped adaptor head 26 embodying a shank 28 and head 30 with a stabilizing ear or lug at 32 to rest against the license plate. The opposite end of the bar is provided with an elongated loop 34 to accommodate an insertable and removable bolt and nut assembly. The bolt is shown in Figure 6 and comprises a screw threaded shank 36, a segmental head 38 and a junctural portion which constitutes a key 40. The surfaces of the head and key are flat faced and the key may be described as polygonal in cross-section. It is evident that this type of bolt permits the head to be turned so that it lies in a horizontal plane whereby it may be slipped in and out through the respective slots in the bracket and plate devices. Once it is in the position shown in Figure 2 the head may then be turned so that it extends at right angles to or crosswise of the coacting slot 18. It is then in the position for attaching or anchoring itself in place. The shank, of course, extends through the slot in the loop and is provided with a conveniently applicable and removable wing nut 42.

With the arrangement shown it is evident that the key head 26 is inserted through the coacting slots in the plate and bracket for turning the head so that it is horizontal and therefore in the natural position whereby it may be slipped through the slots without obstruction or hinderance. The shank portion 28 is of a cross section slightly less than the coacting slots. Therefore, after the head means is inserted through the slots with the bar 24 hanging down said bar is now swung around to assume a horizontal plane and this, of course, puts the head means 30 in a position to also bridge the coacting slot 18. The head means 26 is lateral and also oblique to the longitudinal dimension of the bar means as best shown in Figure 2. The construction is such that the mode of applying and removing the same is virtually self evident by looking at the individual devices shown in Figures 3 and 4 and then examining them in the applied positions in Figures 1 and 2.

For a modification in the construction, the arrangement depicted in Figures 5 and 6 may be employed. Here the alternative fastening devices are denoted by the numerals 45—45 and each comprises a bar or strap member 46 having the head means already described. One end, the right hand end here, of the bar is narrowed to provide what may be conveniently called a reduced shank 48 on which a sliding clip 50 is mounted. The clip comprises a slide 52 with opposed ears 54 having aligned bolt holes 56. This sliding clip is obviously adapted to accommodate the bolt and nut means already described. The outer end of the shank is provided with a lateral detent 58 which holds the sliding clip against accidental displacement.

Minor changes in the shape, size and arrangement of details coming within the field of invention claimed may be resorted to in actual practice, if desired.

Having described the invention what is claimed as new is:

A license plate attaching and securing device comprising an elongated member adapted to be superimposed against a license plate and to extend from one bolt accommodating slot to the other, said member being a flat bar having a lateral T-shaped head at one end and having its opposite end reduced in cross-section to provide a shank, said shank having a lateral detent, a clip slidably mounted on said shank and retained in its useful position on said shank by way of said detent, said clip having ears provided with aligned bolt receiving holes.

ELMER R. HECHT.

References Cited in the file of this patent

UNITED STATES PATENTS

| Number | Name | Date |
|---|---|---|
| 978,023 | Hughes | Dec. 6, 1910 |
| 1,296,275 | Firth | Mar. 4, 1919 |
| 1,358,872 | Parker | Nov. 16, 1920 |
| 2,244,867 | Buchanan | June 10, 1941 |
| 2,564,986 | Meyer | Aug. 21, 1951 |